United States Patent
Nakamura et al.

(10) Patent No.: US 10,101,729 B2
(45) Date of Patent: Oct. 16, 2018

(54) MOTOR CONTROL DEVICE, MOTOR CONTROL METHOD AND COMPUTER READABLE RECORDING MEDIUM

(71) Applicant: FANUC CORPORATION, Minamitsuru-gun, Yamanashi (JP)

(72) Inventors: Tsutomu Nakamura, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/679,584

(22) Filed: Aug. 17, 2017

(65) Prior Publication Data

US 2018/0052449 A1 Feb. 22, 2018

(30) Foreign Application Priority Data

Aug. 22, 2016 (JP) ................. 2016-162096

(51) Int. Cl.
| | |
|---|---|
| H02P 6/06 | (2006.01) |
| H02P 21/22 | (2016.01) |
| H02P 27/04 | (2016.01) |
| G05B 19/416 | (2006.01) |
| G05B 11/01 | (2006.01) |
| G05B 19/19 | (2006.01) |

(52) U.S. Cl.
CPC ........ G05B 19/4163 (2013.01); G05B 11/011 (2013.01); G05B 19/19 (2013.01); *G05B 2219/41* (2013.01); *G05B 2219/43117* (2013.01)

(58) Field of Classification Search
CPC ................................. H02P 29/00; H02P 21/18
See application file for complete search history.

(56) References Cited

U.S. PATENT DOCUMENTS

| 6,184,644 B1 * | 2/2001 | Eguchi | G05B 19/404 |
| | | | 318/624 |
| 2010/0109594 A1 * | 5/2010 | Miyaji | G05B 19/19 |
| | | | 318/632 |
| 2017/0083007 A1 * | 3/2017 | Oda | G05B 19/4166 |

FOREIGN PATENT DOCUMENTS

| EP | 0 450 084 | 10/1991 |
| JP | 48-14468 | 5/1973 |

(Continued)

OTHER PUBLICATIONS

Notification of Reasons for Refusal dated Jul. 10, 2018 in corresponding JP Patent Application No. 2016-162096.

*Primary Examiner* — Bickey Dhakal
*Assistant Examiner* — Charles S Laughlin
(74) *Attorney, Agent, or Firm* — Wenderoth, Lind & Ponack, L.L.P.

(57) ABSTRACT

A motor control device includes a velocity controller configured to calculate a torque command from a velocity command and a motor velocity; a compensation torque calculation unit configured to calculate a compensation torque command by multiplying an error between the motor velocity and a velocity of a driven part by a compensation gain and a compensation filter; a torque control unit configured to control torque of a motor based on a value obtained by adding the torque command and the compensation torque command; and a setting change part configured to change a gain of the velocity controller according to an operating condition of the motor control device, and change at least one of the compensation gain and the compensation filter in accordance with a change in the gain of the velocity controller.

13 Claims, 5 Drawing Sheets

(56) References Cited

FOREIGN PATENT DOCUMENTS

| | | |
|---|---|---|
| JP | 3-110607 | 5/1991 |
| JP | 7-15991 | 1/1995 |
| JP | 2009-44812 | 2/2009 |

* cited by examiner

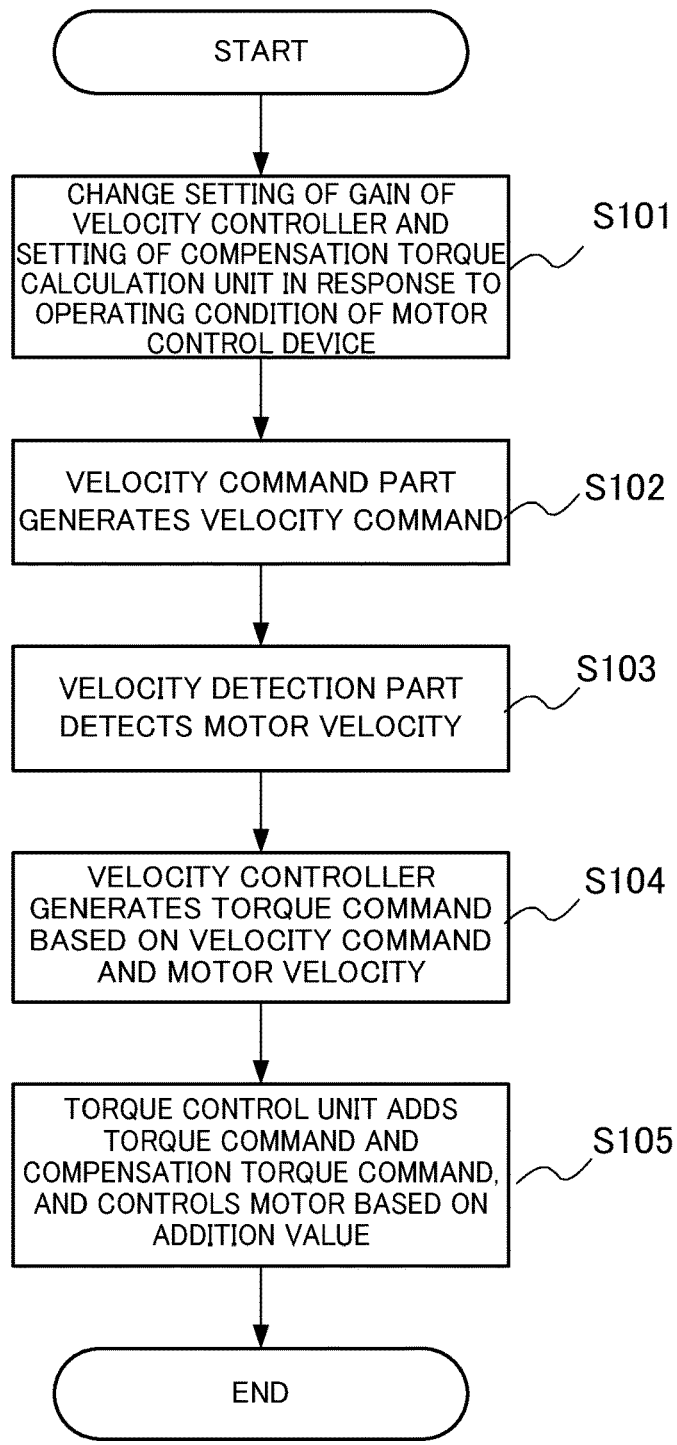

MOTOR CONTROL DEVICE, MOTOR CONTROL METHOD AND COMPUTER READABLE RECORDING MEDIUM

This application is based on and claims the benefit of priority from Japanese Patent Application No. 2016-162096, filed on 22 Aug. 2016, the content of which is incorporated herein by reference.

BACKGROUND OF THE INVENTION

Field of the Invention

The present invention relates to a motor control device, a motor control method and a computer readable recording medium, and in particular, relates to a motor control device that controls a motor connected with a driven part via an elastically deformable element, a motor control method and a computer readable recording medium.

Related Art

A machine tools, industrial machine, etc. have feed axes to drive driven part such as tables or rotary tables by servo motors via mechanical parts such as ball screws, couplings, or reducers. A machine which uses elastic parts such as flexible coupling or reducers tends to have low-frequency vibration and, in that case, the feed axis can be regarded as spring coupled state. There are cases where the velocity of a driven part of a machine and the velocity of the motor do not match due to this spring coupling, whereby a low-frequency vibration under a servo control bandwidth occurs. In order to suppress this low-frequency vibration, Patent Document 1 describes a method of obtaining the velocity of a driven part of a machine, and compensating a torque command value according to a value proportional to the difference between this velocity and the actual velocity from a velocity detector which detects the rotational velocity of the motor.

Patent Document 1: Japanese Unexamined Patent Application, Publication No. H03-110607

SUMMARY OF THE INVENTION

In a machining operation by automatic operation of a machine tool, cutting feed and rapid traverse (positioning), which has a feed velocity faster than cutting feed, are performed; however, the control performance needed in a motor control device greatly differs between cutting feed and rapid traverse. Cutting feed which influences the machining quality requires disturbance suppression performance compared to rapid traverse, and switching to high gain of the velocity controller may be performed.

The present invention has an object of providing a motor control device, a motor control method, and a computer-readable recording medium, which can obtain appropriate compensation torque in accordance with a case of the operating condition of the motor control device changing as in cutting feed and rapid traverse, and the gain of the velocity controller being changed accompanying this.

According to a first aspect of the present invention, a motor control device for a motor coupled with a driven part of a machine via an elastically deformable element, includes: a velocity command part configured to generate a velocity command; a first velocity detector configured to detect a motor velocity of the motor; a second velocity detector configured to detect a velocity of the driven part; a velocity controller configured to calculate a torque command from the velocity command and the motor velocity; a compensation torque calculation unit configured to calculate a compensation torque command by multiplying an error between the motor velocity and the velocity of the driven part by a compensation gain and compensation filter; a torque control unit configured to control torque of the motor based on a value obtained by adding the torque command and the compensation torque command; and a setting change part configured to change a gain of the velocity controller according to an operating condition of the motor control device, and change at least one of the compensation gain and the compensation filter in accordance with a change in the gain of the velocity controller.

According to a second aspect of the present invention, in the motor control device as described in the first aspect, the setting change part may multiply a transfer characteristic of the velocity controller by $F(s)$ according to the change in the gain of the velocity controller performed in response to the operating condition of the motor control device, and multiply the compensation filter of the compensation torque calculation unit by $F(s)$.

According to a third aspect of the present invention, in the motor control device as described in the first aspect, the velocity controller may multiply the transfer characteristic by $F(s)$ according to the change in the gain performed in response to the operating condition of the motor control device, and the compensation torque calculation unit may multiply the compensation gain by $|F(j\omega)|$ according to an angular frequency $\omega$ designated in advance.

According to a fourth aspect of the present invention, in the motor control device as described in the third aspect, a change $F(s)$ in the transfer characteristic of the velocity controller may be a constant A.

According to a fifth aspect of the present invention, in the motor control device as described in the first aspect, the compensation torque calculation unit may decrease the compensation gain, when causing gain of the velocity controller to change in response to the operating condition of the motor control device.

According to a sixth aspect of the present invention, in the motor control device as described in any one of the first to fifth aspects, the operating condition of the motor control device may be either cutting feed or rapid traverse of the driven part.

According to a seventh aspect of the present invention, a motor control method for a motor control device of a motor coupled with a driven part of a machine via an elastically deformable element, includes: generating a velocity command; calculating a torque command by a velocity controller based on a difference between the velocity command and a velocity of the driven part; calculating a compensation torque command by multiplying error between motor velocity of the motor and the velocity of the driven part by a compensation gain and compensation filter; controlling torque of the motor based on a value obtained by adding the torque command and the compensation torque command; and changing the gain of the velocity controller in response to the operating condition of the motor control device, and changing at least one among the compensation gain and the compensation filter in accordance with the change in the gain of the velocity controller.

According to an eighth aspect of the present invention, in the motor control method as described in the seventh aspect, a transfer characteristic of the velocity controller may be multiplied by $F(s)$ according to the change in the gain of the velocity controller performed in response to the operating condition of the motor control device, and the compensation filter may be multiplied by F(s).

According to a ninth aspect of the present invention, in the motor control method as described in the seventh aspect, the velocity controller may multiply the transfer characteristic by F(s) according to the change in the gain performed in response to the operating condition of the motor control device, and the compensation gain may be multiplied by |F(jω)| according to an angular frequency ω designated in advance.

According to a tenth aspect of the present invention, in the motor control method as described in the ninth aspect, the change F(s) in the transfer characteristic of the velocity controller may be a constant A.

According to an eleventh aspect of the present invention, in the motor control method as described in the seventh aspect, the method may decrease the compensation gain when causing the gain of the velocity controller to change in response to the operating condition of the motor control device.

According to a twelfth aspect of the present invention, in the motor control method as described in any one of the seventh to eleventh aspects, the operating condition of the motor control device may be either cutting feed or rapid traverse of the drive part.

According to a thirteenth aspect of the present invention, a non-transitory computer-readable recording medium is encoded with a motor control program enabling a computer serving as a motor control device of a motor coupled to a driven part of a machine via an elastically deformable element to execute: processing of generating a velocity command; processing of calculating a torque command by way of a velocity controller based on the velocity command and a velocity of the driven part; processing of calculating a compensation torque command by multiplying error between a motor velocity of the motor and the velocity of the driven part by a compensation gain and a compensation filter; processing of controlling torque of the motor based on a value obtained by adding the torque command and the compensation torque command; and processing of changing the gain of the velocity controller in response to the operating condition of the motor control device, and changing at least one among the compensation gain and the compensation filter in accordance with the change in the gain of the velocity controller.

According to the present invention, it is possible to obtain appropriate compensation torque in accordance with a case of the operating condition of a motor control device changing, and the gain of the velocity controller being changed accompanying this.

BRIEF DESCRIPTION OF THE DRAWINGS

FIG. 5 is a flowchart for explaining an embodiment of a motor control method of the present invention.

DETAILED DESCRIPTION OF THE INVENTION

Figure 1:
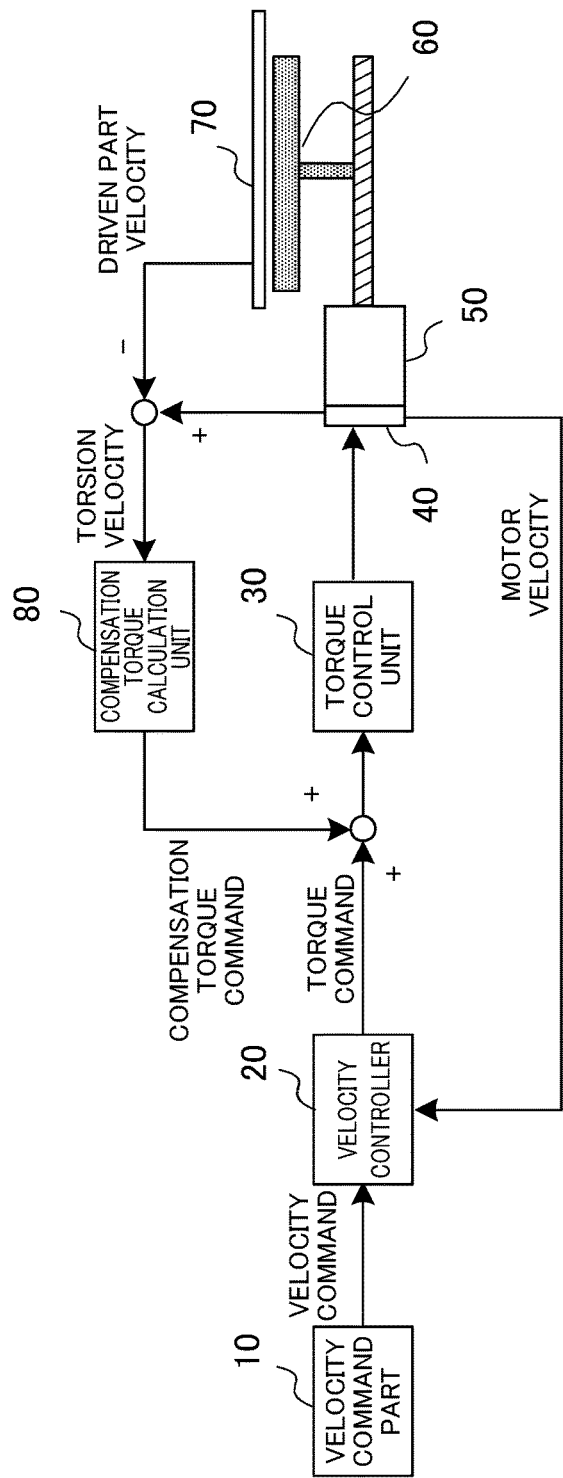
FIG. 1 is a block diagram for explaining the configuration of a motor control device serving as a technical premise.

Hereinafter, embodiments of the present invention will be explained in detail using the drawings. Prior to explanation of the embodiment of the present invention, the technology serving as the premise will be explained. FIG. 1 is a block diagram for explaining the configuration of a motor control device serving as a technical premise. As shown in FIG. 1, a velocity command outputted from a velocity command unit 10 is inputted to a velocity controller 20, and the velocity controller 20 generates a torque command using the inputted velocity command and the inputted motor velocity of a motor 50 (revolution velocity of motor), then outputs the torque command to a torque control unit 30. The torque control unit 30 controls the revolution of the motor 50 based on the addition value of the torque command and a compensation torque command from a compensation torque calculation unit 80. The revolution velocity of the motor 50 is detected by a velocity detector 40 such as an encoder, and is outputted to the velocity controller 20. The motor 50 is coupled to a driven part 60 of a machine by a feed axis such as a ball screw, whereby the rotational motion of the motor 50 is converted by the feed axis such as a ball screw into linear motion of the driven part 60. The velocity of the driven part 60 (driven part velocity) is detected by a velocity detector 70, the difference between the velocity of the drive part 60 and the velocity detected by the velocity detector 40 is inputted to the compensation torque calculation part 80 as a torsion velocity. The compensation torque calculation part 80 calculates the compensation torque based on this difference.

As already explained, in a machining operation according to automatic operation of a machine tool, cutting feed and rapid traverse (positioning), which has a feed velocity faster than cutting feed, are performed, and the control performance needed in the motor control device differs greatly between cutting feed and rapid traverse. Cutting feed which influences the machining quality requires disturbance suppression performance compared to rapid traverse, and switching to high gain of the velocity controller may be performed. Embodiments of the motor control device and motor control method of the present invention change the gain of the velocity controller and the settings of the compensation torque calculation unit, according to the operating condition of the motor control device such as cutting feed and rapid traverse.

Figure 2:
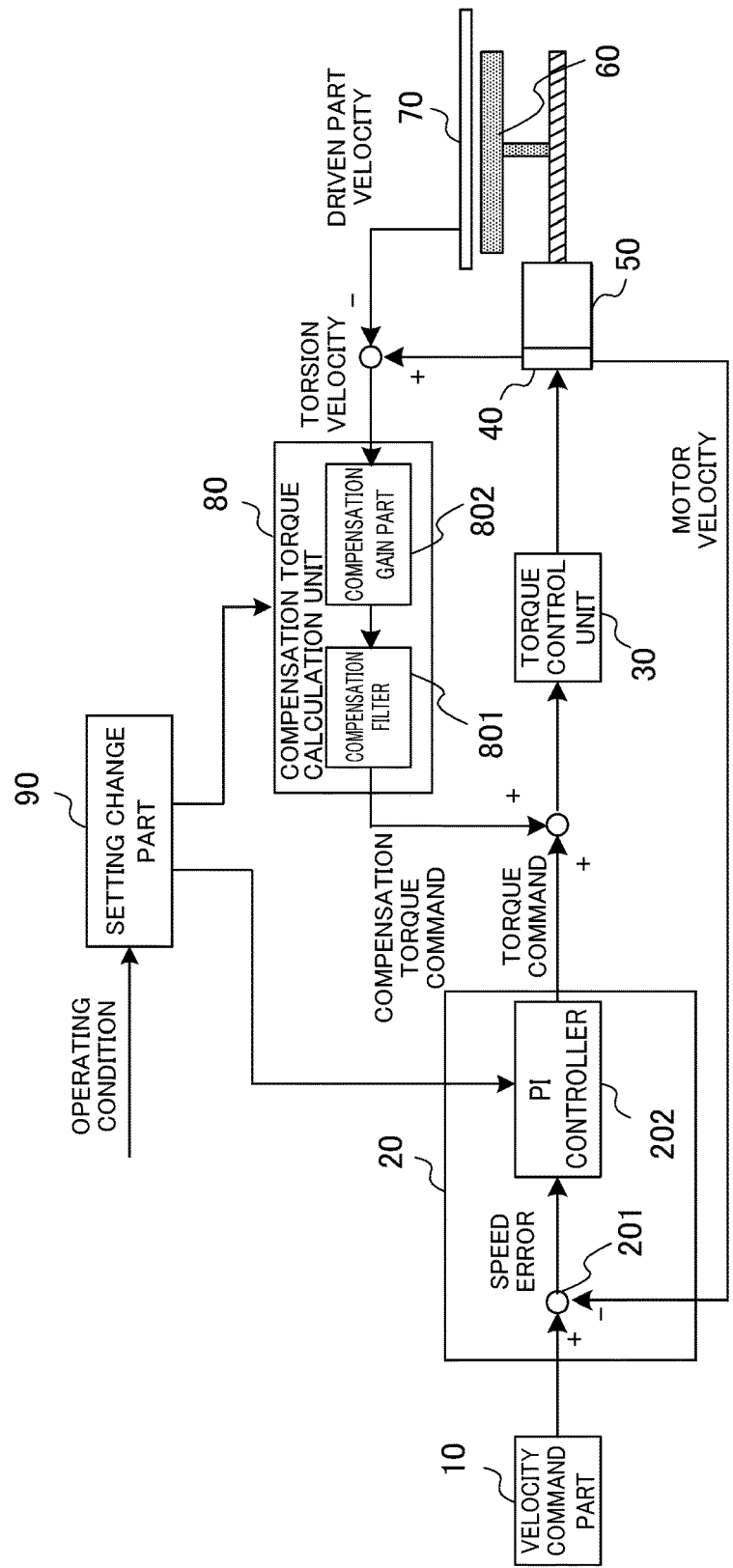
FIG. 2 is a block diagram for explaining the configuration of one embodiment of the motor control device of the present invention.

Hereinafter, an embodiment of the present invention will be explained using FIGS. 2 to 5. FIG. 2 is a block diagram for explaining the configuration of an embodiment of the motor control device of the present invention. The same reference numbers are assigned for similar constitutional members as the motor control device shown in FIG. 1, and explanations thereof will be omitted. The machine to which the motor control device of the present embodiment is applied is a machine tool such as a laser beam machine, electric discharge machine and cutting machine, industrial machine such as a robot, or the like. As shown in FIG. 2, the motor control device of the present embodiment includes, as a velocity controller 20 shown in FIG. 1, an subtractor 201 that obtains the difference between the velocity command from the velocity command unit 10 and the motor velocity from the velocity detector 40, and a feedback controller (hereinafter referred to as PI controller) 202 of proportional/integral (PI) control (Kp+Ki/s) of the proportional gain Kp and integral gain Ki, to which the speed error from the subtractor 201 is inputted. In addition, as shown in FIG. 2, the motor control device of the present embodiment includes a compensation filter 801 and a compensation gain part 802 as the compensation torque calculation unit 80 shown in FIG. 1. The compensation filter 801, for example, can be configured by a first order low-pass filter. The compensation filter 801 is capable of adding a bandpass filter or higher-order low-pass filter to the first order low-pass filter, or using a bandpass filter or a higher-order low-pass filter in place of the first order low-pass filter. The objective of providing a compensation filter is to extract vibrations of a frequency intended for vibration suppression, and to avoid destabilization due to a high-frequency vibration component. The motor control device shown in FIG. 2 further includes a setting change unit 90 that changes the gain of the PI controller 202, and changes at least one among the gain of the compensation gain part 802 and compensation filter 801 of the compensation torque calculation unit 80 in accordance with this change. In place of the PI controller 202, a proportional (P) controller, or proportional/integral/derivative (PID) controller may be used.

Figure 3:
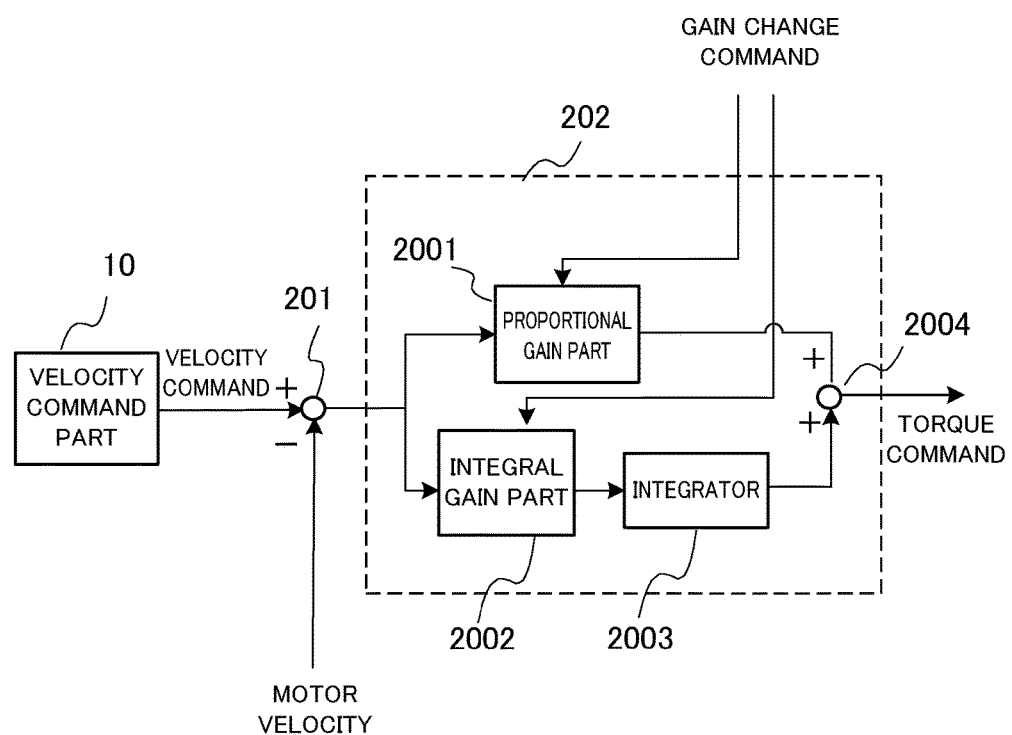
FIG. 3 is a block diagram showing a configuration example of a PI controller.

FIG. 3 is a block diagram showing a configuration example of a PI controller. As shown in FIG. 3, the PI controller 202 includes a proportional gain part 2001, integral gain part 2002, integrator 2003, and adder 2004. The speed error from the subtractor 201 is inputted to the proportional gain part 2001 and integral gain part 2002, respectively. The speed error is amplified by the integral gain part 2002, and the amplified speed error is integrated by the integrator 2003. In addition, the speed error is amplified by the proportional gain part 2001. The output of the proportional gain 2001 and the output of the integrator 2003 are added by the adder 2004. The arrangement sequence of the integral gain 2002 and integrator 2003 may be reversed. Among the gains of the PI controller 2002, the proportional gain shall be multiplied by $A_p$, and the integral gain multiplied by $A_i$. The gain $C_1(s)$ of the PI controller 2002 prior to gain change is represented by the following Equation 1 (hereinafter indicated as Formula 1).

$$C_1(s) = K_p + K_i/s \qquad [\text{Math 1}]$$

The gain $C_2(s)$ of the PI controller 202 after gain change is represented by the following Equation 2 (hereinafter indicated as Formula 2).

$$C_2(s) = A_p K_p + A_i K_i/s \qquad [\text{Math 2}]$$

The transfer characteristic of the PI controller 202 is multiplied by F(s) indicated by Equation 3 (hereinafter indicated as Formula 3).

$$F(s) = \frac{C_2(s)}{C_1(s)} = \frac{A_p K_p + A_i K_i/s}{K_p + K_i/s} \qquad [\text{Math 3}]$$

Figure 4:
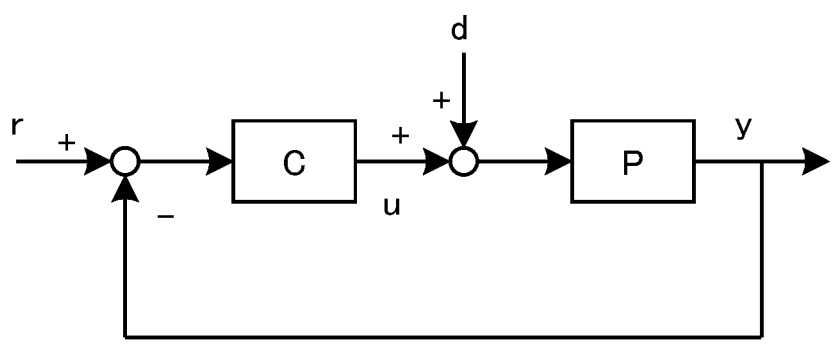
FIG. 4 is a block diagram of a velocity control system of a motor.

The compensation torque command shown in FIGS. 1 and 2 is considered a torque edge disturbance for the velocity control system of the motor 50. FIG. 4 is a block diagram of a velocity control system of the motor 50. In FIG. 4, the difference between the velocity command r and the motor velocity y serving as the control value (output) is inputted to the controller of gain C. The disturbance d corresponding to the compensation torque is added to the control input u corresponding to the torque command, outputted from the controller, and the control input u to which the disturbance d was added is inputted to the motor serving as the control target P. The motor velocity y is outputted from the control target P. The influence on the motor velocity y by the disturbance d corresponding to the compensation torque is indicated by Equation 4.

$$\frac{y}{d} = \frac{P}{1 + PC} \qquad [\text{Math 4}]$$

Although FIG. 4 is a generalized control block diagram, if mentioned by the relationship with the velocity control system illustrated in FIGS. 1 to 3, the control target P expresses the transfer characteristic from the motor torque to motor velocity, of a machine including the motor 50, ball screw 60 and driven part 70. The transfer function of the control target P is a function P(s) of the Laplace operator s; however, it is abbreviated as argument. Formula 4 is derived as follows. In the block diagram of FIG. 4, Formula 5 is established.

$$P(C(r-y)+d) = y \qquad [\text{Math 5}]$$

By expanding, it becomes Formula 6, and by transposing, it becomes Formula 7.

$$PCr - PCy + Pd = y \qquad [\text{Math 6}]$$

$$(1+PC)y = PCr + Pd \qquad [\text{Math 7}]$$

Furthermore, by multiplying Formula 7 by $(1+PC)^{-1}$ (expression is not 0), it becomes Formula 8.

$$y = (PC/(1+PC))r + (P/(1+PC))d \qquad [\text{Math 8}]$$

The transfer characteristic from the command r to output y, and transfer characteristic from the disturbance d to output y are linear, and each can be discussed independently; therefore, in the case of generally discussing the disturbance characteristic, it is possible to dispute the influence that the disturbance d has on the output y in the form of Formula 4 by putting r=0 in Formula 8.

When handling in the motor control device of FIG. 2, in the case of the compensation gain and compensation filter of the compensation torque calculation part 80 being adjusted to match the gain $C_1(s)$ of the velocity controller 202, by the gain of the velocity controller 202 being changed to the gain $C_2(s)$, y/d is changed to Formula 9.

$$\frac{P}{1+PC_1(s)} \rightarrow \frac{P}{1+PC_2(s)} = \frac{P}{1+PFC_1(s)} \qquad [\text{Math 9}]$$

Consequently, y/d comes to be changed to a magnification indicated by Equation 10 (indicated as Formula 10).

$$\frac{1+PC_1}{1+PFC_1} \qquad [\text{Math 10}]$$

Originally since the compensation torque was intended as vibration suppression under a servo control bandwidth, 1<<PC is established; therefore, the above-mentioned Equation 6 becomes 1/F(S). Consequently, by the gain of the velocity controller being changed from C1(s) to C2(s), the compensation torque comes to be multiplied by 1/F(s). For this reason, problems can occur in that:

(1) when the compensation gain is adjusted in accordance with when during the rapid traverse of low velocity control gain, the compensation torque is insufficient upon cutting feed with high velocity control gain, and sufficient vibration suppression ability cannot be exhibited.

(2) when the compensation gain is adjusted in accordance with when during cutting feed with high velocity control gain, the compensation torque becomes excessive during rapid traverse with low velocity control gain, and the control system becomes unstable.

Therefore, in the present embodiment as shown in FIG. 2, the setting change part 90 changes the gain of the PI controller 202 in response to a signal indicating the operating condition of the motor control device such as cutting feed or rapid traverse, and in accordance with this change, the setting change part 90 changes at least one of the gain of the compensation gain part 802 and the compensation filter 801 of the compensation torque calculation unit 80. The signal indicating the operating condition is given by a computerized numerical control program, for example.

As an example of a case of the setting change part 90 changing the gain of the compensation gain part 802, the setting change part 90 multiplies the compensation filter 801 of the compensation torque calculation unit 80 by F(s), when multiplying the transfer characteristic of the PI controller 202 by F(s). Herein, although the setting change part 90 multiples the compensation filter by F(s), so long as the transfer characteristic of the overall compensation torque calculation unit 80 is multiplied by F(s), the setting change part 90 may multiply the gain of the compensation gain part 802 by F(s). For example, in the case of the original transfer function of the compensation filter being expressed by G(s), the transfer function of the compensation filter 801 becomes G(s)*F(s) from G(s) by the setting change part 90 when the compensation filter is multiplied by F(s).

In addition, the compensation torque was calculated from the torsion velocity for suppressing the low-frequency vibration originally. Consequently, the waveform thereof is sinusoidal, and only the vibration frequency component is important. Therefore, by multiplying the gain of the compensation gain part 802 of the compensation torque calculation unit 80, by the value $|F(j\omega)|$ corresponding to the vibration angular frequency $\omega$ in the gain change magnification F(s) of the PI controller 202, an equivalent vibration damping ability can be maintained. In this case, it is no longer necessary to worry about the increase in calculation amount due to the addition of the compensation filter 801. In addition, the gain change in the compensation gain part 802 of the PI controller 202 for cutting feed and rapid traverse may be simple. For example, when both the gain of the proportional gain part 2001 and the gain of the integral gain part 2002 are multiplied by the constant A, the gain magnification of the compensation gain part 802 of the compensation torque calculation unit 80 are multiplied by the constant A, and it is no longer necessary to make a calculation for the magnification F(s) of the compensation filter 801. Thus far, the configuration which optimizes the vibration damping ability for both cutting feed and rapid traverse has been explained. However, during rapid traverse which does not influence the cutting surface, the vibration damping ability is not particularly important. Therefore, it has also been considered to turn OFF the compensation torque limited to during rapid traverse which has low velocity control gain. Simplification of the servo tuning can be realized by turning OFF the vibration damping during rapid traverse and decreasing the compensation gain (preferably setting the compensation gain to 0).

FIG. 5 is a flowchart for explaining an embodiment of a motor control method according to the present invention. As shown in FIG. 5, the velocity command part 10 generates a velocity command in Step S101, and in response to the operating condition of the motor control device, the setting change part 90 changes the setting of the gain of the velocity controller 20 and the setting of the compensation torque calculation unit 80 in Step S102. For example, based on the signal indicating the operating condition of the motor control device such as cutting feed and rapid traverse from the computerized numerical control program, the setting change part 90 changes the setting of the gain of the velocity controller 20, and at least one setting among the compensation gain and the compensation filter of the compensation torque calculation unit 80.

Next, in Step S103, the velocity detection unit 40 detects the velocity of the motor, and in Step S104, the velocity controller 20 generates a torque command based on the velocity command and the motor velocity. Then, in Step S105, the torque control unit 30 adds the torque command and the compensation torque command, and controls the motor 50 based on this addition value.

Although an embodiment of the present invention has been explained above, the entirety or part of the functions of the motor control device can be realized by way of hardware, software or a combination thereof. Herein, realized by way of software indicates the matter of being realized by a computer reading and executing programs. In the case of constituting by hardware, it is possible to constitute a part or the entirety of the motor control device by integrated circuits (IC) such as LSI (Large Scale Integrated circuit), ASIC (Application Specific Integrated Circuit), gate array, and FPGA (Field Programmable Gate Array).

In the case of realizing by software, a part or the entirety of the motor control device can be constituted by a computer including a CPU and a storage unit such as a hard disk and ROM storing programs, and execute programs. More specifically, by storing the information required in computation in a second storage unit such as RAM, and executing processing in accordance with the block diagram of FIG. 2 and a program following the flowchart of FIG. 5, the operations of part or the entirety of the servomotor control device are executed by a program. The program can be read from a storage unit such as a hard disk from an external storage medium such as CD-ROM, DVD or flash memory on which the program is recorded.

The programs can be stored using various types of computer-readable recording media (computer readable media), and provided to the computer. The computer-readable media includes non-transitory computer readable media. In addition, the computer readable recording media includes various types of tangible storage media. Examples of computer-readable media include magnetic media (for example, flexible disk, magnetic tape, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)).

Although the respective embodiments and examples of the present invention have been explained above, the present invention is not to be limited to the aforementioned respective embodiments and examples, and for one skilled in the art, it is possible to modify or change into various forms within a scope not departing from the gist of the present invention, based on the disclosure in the claims, and these modified examples or changed examples also fall under the scope of rights of the present invention.

EXPLANATION OF REFERENCE NUMERALS 10 velocity command part
20 velocity control unit
30 torque control unit 40 velocity detector
50 motor
60 driven part of machine
70 velocity detector
80 compensation torque calculation unit
90 setting change unit
201 subtractor
202 PI controller
801 compensation filter
802 compensation gain part

What is claimed is:

1. A motor control device for a motor coupled with a driven part of a machine via an elastically deformable element, comprising:
    a velocity command part configured to generate a velocity command;
    a first velocity detector configured to detect a motor velocity of the motor;
    a second velocity detector configured to detect a velocity of the driven part;
    a velocity controller configured to calculate a torque command from the velocity command and the motor velocity;
    a compensation torque calculation unit configured to calculate a compensation torque command by multiplying an error between the motor velocity and the velocity of the driven part by a compensation gain and compensation filter;
    a torque control unit configured to control torque of the motor based on a value arrived at by adding the torque command and the compensation torque command; and
    a setting change part configured to change a gain of the velocity controller according to an operating condition of the motor control device, and change at least one of the compensation gain and the compensation filter in accordance with a change in the gain of the velocity controller.

2. The motor control device according to claim 1, wherein the setting change part multiples a transfer characteristic of the velocity controller by $F(s)$, a transfer function of Laplace operator s, according to the change in the gain of the velocity controller performed in response to the operating condition of the motor control device, and multiples the compensation filter of the compensation torque calculation unit by $F(s)$.

3. The motor control device according to claim 1,
    wherein the velocity controller multiples a transfer characteristic by $F(s)$, a transfer function of Laplace operator s, according to the change in the gain performed in response to the operating condition of the motor control device, and
    wherein the compensation torque calculation unit multiples the compensation gain by $|F(j\omega)|$, a magnification of $F(s)$ where Laplace operator s equals to $j\omega$, according to an angular frequency $\omega$ designated in advance.

4. The motor control device according to claim 3, wherein a change in the transfer characteristic of the velocity controller is a constant A.

5. The motor control device according to claim 1, wherein the compensation torque calculation unit decreases the compensation gain, when causing gain of the velocity controller to change in response to the operating condition of the motor control device.

6. The motor control device according to claim 1, wherein the operating condition of the motor control device is either cutting feed or rapid traverse of the driven part.

7. A motor control method for a motor control device of a motor coupled with a driven part of a machine via an elastically deformable element, the method comprising:
    generating a velocity command;
    calculating a torque command by a velocity controller based on a difference between the velocity command and a velocity of the driven part, the velocity of the driven part being detected by a second velocity detector;
    calculating a compensation torque command by multiplying error between motor velocity of the motor and the velocity of the driven part by a compensation gain and compensation filter, the motor velocity of the motor being detected by a first velocity detector;
    controlling torque of the motor based on a value obtained by adding the torque command and the compensation torque command; and
    changing the gain of the velocity controller in response to the operating condition of the motor control device, and changing at least one among the compensation gain and the compensation filter in accordance with the change in the gain of the velocity controller.

8. The motor control method according to claim 7, wherein a transfer characteristic of the velocity controller is multiplied by $F(s)$, a transfer function of Laplace operator s, according to the change in the gain of the velocity controller performed in response to the operating condition of the motor control device, and the compensation filter is multiplied by $F(s)$.

9. The motor control method according to claim 7, wherein the velocity controller multiples a transfer characteristic by $F(s)$, a transfer function of Laplace operator s, according to the change in the gain performed in response to the operating condition of the motor control device, and
    wherein the compensation gain is multiplied by $|F(j\omega)|$, a magnification of $F(s)$ where Laplace operator s equals to $j\omega$, according to an angular frequency $\omega$ designated in advance.

10. The motor control method according to claim 9, wherein a change in the transfer characteristic of the velocity controller is a constant A.

11. The motor control method according to claim 7, wherein the method decreases the compensation gain when causing the gain of the velocity controller to change in response to the operating condition of the motor control device.

12. The motor control method according to claim 7, wherein the operating condition of the motor control device is either cutting feed or rapid traverse of the drive part.

13. A non-transitory computer-readable recording medium encoded with a motor control program enabling a computer serving as a motor control device of a motor coupled to a driven part of a machine via an elastically deformable element to execute:
    processing of generating a velocity command;
    processing of calculating a torque command by way of a velocity controller based on the velocity command and a velocity of the driven part, the velocity of the driven part being detected by a second velocity detector;
    processing of calculating a compensation torque command by multiplying error between a motor velocity of the motor and the velocity of the driven part by a compensation gain and a compensation filter, the motor velocity of the motor being detected by a first velocity detector;

processing of controlling torque of the motor based on a value obtained by adding the torque command and the compensation torque command; and processing of changing the gain of the velocity controller in response to the operating condition of the motor control device, and changing at least, one among the compensation gain and the compensation filter in accordance with the change in the gain of the velocity controller.

* * * * *